Patented June 23, 1953

2,643,262

UNITED STATES PATENT OFFICE 2,643,262

ORGANIC COMPOUNDS OF TITANIUM

Charles O. Bostwick, Stanton, Del., assignor to E. I. du Pont de Nemours and Company, Wilmington, Del., a corporation of Delaware No Drawing. Application April 28, 1950, Serial No. 158,920

19 Claims. (Cl. 260—429)

This invention relates to novel methods for the preparation of a new type of titanium organic compound. More particularly, it concerns certain glycol titanates and their preparation.

I have devised a new process whereby a hitherto unknown class of titanium compounds, organic in nature, is produced. These new compounds may be either complex monomers or polymers, and they are frequently chelated; depending upon their exact nature, these products are especially useful as adhesives, as surface-active agents, as additives for various coating and sealing compositions, and the like.

The general procedure which I have invented, whereby these new substances are formed, broadly comprises effecting alcoholysis of organic esters of orthotitanic acid with glycols of the 2,3-diorgano-1,3-diol type, i. e., having the formula

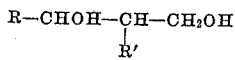

wherein R and R′ are organic radicals. This chemical reaction whereby alcoholysis occurs is remarkably simple, and the products comprise organic compounds of titanium wherein the essential structural unit is

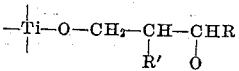

and R and R′ are the same or different organic radicals, e. g., alkyl, aryl, aralkyl, alkaryl, etc., of which methyl, ethyl, propyl, butyl, pentyl, hexyl, octyl, phenyl, benzyl, tolyl, naphthyl, etc., are examples. I have termed these new compounds "glycol titanates," and, depending upon the reactants used and the exact composition of these products, they may comprise syrupy liquids, highly viscous or tacky materials, or even powdery solids.

According to one specific embodiment of my process, I commingle an organic ester of orthotitanic acid and a glycol of the above-mentioned formula. Reaction between the two substances occurs generally at room temperature and without any particular operating restrictions. Heat is usually evolved, and the mixture may thicken, so that often it is desirable, for easy handling, to incorporate a thinner or inert solvent therein. To facilitate reaction, good agitation of the mass is advisable, as in the case of most processes of this nature. The reaction which occurs may be considered as alcoholysis of the titanium ortho ester, whereby an exchange of radicals between the two reactants occurs. The desired glycol titanate product is obtained, with a by-product comprising the alcohol which had previously been esterified with the orthotitanic acid.

According to a still more specific and commercially-preferred embodiment of my invention, I utilize as the glycol reactant a substance such as an octylene glycol of the 2,3-diorgano-1,3-diol type. This is mixed for reaction with an ortho ester of titanic acid, alcoholysis occurs, and an octylene glycol titanate results which has as its essential structural unit the radical

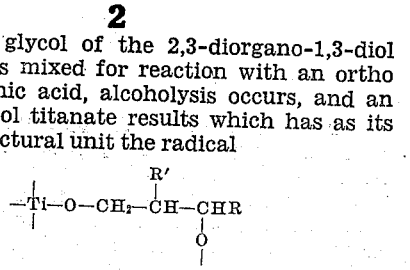

wherein R and R′ comprise carbon chains together supplying five carbon atoms. Examples of forms of octylene glycol titanate thus obtainable are those having the radicals

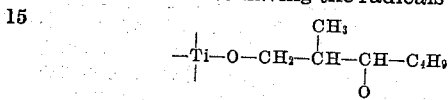

or

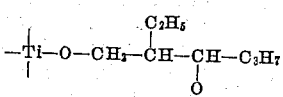

or

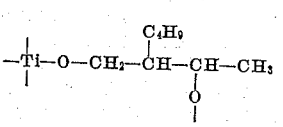

Essentially the same procedure may be followed employing hexylene glycols of the requisite structure, to prepare hexylene glycol titanates containing the usual radical

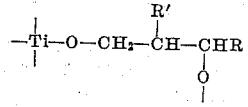

where R and R′ are carbon chains together totalling three C's, i. e.

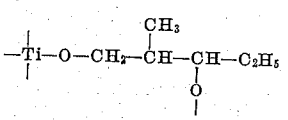

or

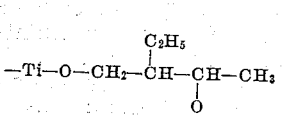

Similarly, decylene glycols may be reacted to form decylene glycol titanates having the unit structure

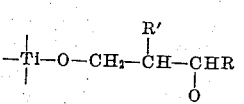

the number of carbon atoms in (R+R′) here totaling seven. A few of the many possible products are:

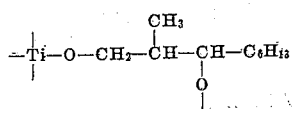

or

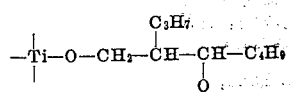

or

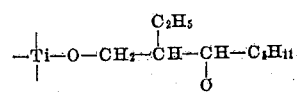

For many commercial applications, it is not necessary to purify the product obtained from the alcoholysis reaction, i. e., to remove by-product alcohol and/or solvent and the like. However, the by-product alcohol may be removed if desired, by known means such as evaporation with heat and/or vacuum-distillation, etc. In some instances I prefer to wash the alcoholysis product with water. The by-product alcohol is often water-soluble; washing with water thus results in a two-layer system, a water layer containing such alcohol and an organic layer containing the product and, if such has been used, the solvent therefor. These two layers are easily separable, of course. In fact, I sometimes prefer to utilize a water-wash, even where removal of the by-product is not at issue. In some reactions, where less glycol is utilized than is stoichiometrically required to react with the titanium ester, water appears to enter into the reaction by the familiar process of hydrolysis, removing any unreacted alkoxy groups which remain bonded to the titanium after the reaction with the glycol. Complete hydrolysis is often not necessary to obtain commercially valuable adhesives, surface-active agents and the like; presence of unreacted alkoxy groups appears to have no deleterious effect in many cases. However, for some uses it is desirable to render the compound initially non-reactive with water; under these circumstances, water-washing is perhaps the simplest procedure.

As hereinbefore noted, this peculiar new reaction generally proceeds simply at room temperature. It is exothermic, considerable heat being often evolved. If the mass becomes too viscous for ready handling, essentially any inert thinner or solvent may be added to maintain proper fluidity. The method of commingling the reactants may be a relatively important factor, where a glycol titanate having a particular degree of substitution by glycol groups is desired. Thus, the glycol is often preferably added to the titanium ester, or the two reactants are simultaneously charged into a vessel and mixed rapidly with good agitation. This prevents the presence of an excess of glycol during the course of the reaction, which excess might serve to inhibit proper substitution.

Possible relative proportions of the reacting materials may be readily prognosticated by an examination of the nature of the alcoholysis reaction or exchange of radicals. Orthotitanic acid is generally conceived of as Ti(OH)$_4$; its simplest esters with alcohol will thus contain four alkoxy groups or radicals. The glycols which I find useful contain one primary hydroxyl (OH) group, and it is this which apparently first reacts with the titanium ester. It is thus obvious that one may generally utilize up to four mols of the glycol per mol of the titanium ester. Depending upon the degree of radical-exchange desired, essentially any lesser molar proportion is possible; however, I usually find that products of most commercial value are obtained when the proportions of glycol: titanium ester are from ½:1 to 4:1.

Different compounds will of course result as different molar proportions of reactants are employed. My process is of particular interest in that complex chelated and water-insensitive compounds may be produced, the secondary hydroxyl group of the glycol being attracted to the titanium atom by the nature of the latter's two secondary valences to form chelated compounds having as their essential structural unit the radical

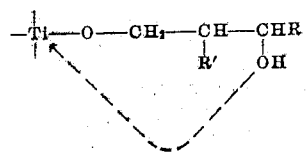

For the sake of further illustration, following are probable chemical structures of various of the titanium products, where the molar proportions are as noted (R and R' being organic radicals such as those of the type above noted).

A. (1 molecule of Ti ester to 1 molecule of glycol.)

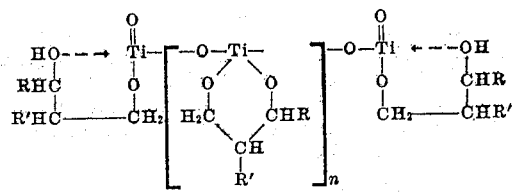

B. (1 molecule of Ti ester to 2 molecules of glycol.)

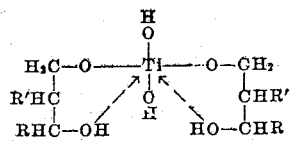

C. (1 molecule of Ti ester to 3 molecules of glycol.)

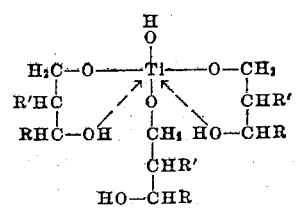

D. (1 molecule of Ti ester to 4 molecules of glycol.)

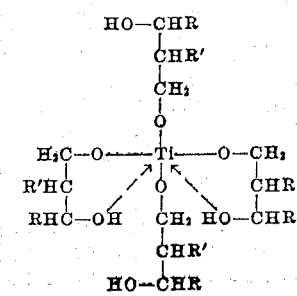

Note that in the above formulae, where the proportion of glycol to titanium is less than 4:1, the products are exemplified in their hydrolyzed state, i. e., following treatment with water and heat. Note, also, the chelation which I have attempted to illustrate by the dotted lines, and which frequently occurs between the Ti and the secondary (OH) groups. Titanium has, of course, only two secondary valences. Hence, in the case of compounds like those lettered (C) and (D) above, it is possible for only two of the glycol units to chelate with the Ti, as shown.

The following examples are given simply to illustrate my invention and not in any way to limit its scope: (In each instance, molecular weight was measured by the conventional determination of the freezing point depression of benzene.)

*Example I*

Equimolar proportions of one form of octylene glycol (2-ethyl-1,3-hexanediol) and tetraisopropyl titanate, or 43.8 parts by weight of the glycol to 85.3 parts of the titanate, were mixed at room temperature, utilizing n-heptane as a solvent. The mass was intimately mixed and heat was evolved; excess water (an equal volume) was added to the reaction vessel, whereby the material became stratified. An aqueous stratum containing isopropyl alcohol separated from a heptane layer containing the desired product. This latter layer was separated out, the heptane was simply evaporated at room temperature, and octylene glycol titanate was obtained as a powdery white solid. This product was found to have a molecular weight of 1520 and a $TiO_2$ content of 39.3%. It was soluble in the various organic solvents and completely water-insensitive. The formula of the compound is believed to correspond to that shown under (A) above, where the value of $n$ is 6, and R and R' are propyl and ethyl groups, respectively.

*Example II*

Two-ethyl-1,3 hexanediol and tetra-n-butyl titanate were mixed at room temperature in the proportions of 19.47 parts by weight to 22.6 parts respectively (equivalent to a molar ratio of 2:1). Reaction proceeded vigorously, and the liquid product containing n-butanol was useful without further treatment as a surface-active agent. Its structure was apparently:

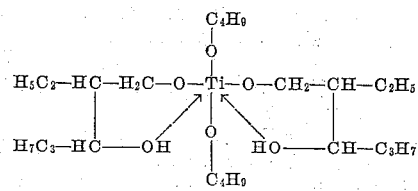

*Example III*

Two mols of a 2,3-diorgano-1,3-diol type octylene glycol and one mol of tetraethyl titanate (462.2 parts by weight of the glycol and 361 parts of the titanate) were mixed with an equal volume of cyclohexane. Alcoholysis or exchange of the radicals occurred as usual; the product was washed with water, the ethyl alcohol being thus removed and complete hydrolysis of the glycol titanate being thus effected. The cyclohexane was volatilized by heating at 230° C. A clear, viscous liquid was obtained as a product; it had a molecular weight of 1210 and a $TiO_2$ content of 24.9%.

*Example IV*

Two mols of a hexylene glycol (2-methyl-1,3-pentanediol) and one mol of tetraisopropyl titanate were mixed as usual and the alcoholysis reaction took place. The amount of water theoretically necessary for complete hydrolysis of the product glycol titanate was added thereto, and the mass heated. A highly viscous, tacky material resulted, which appeared to be represented by the structure:

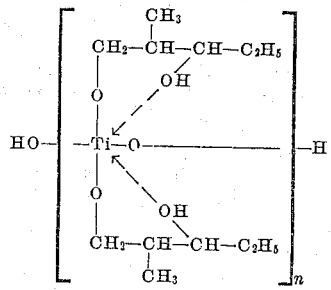

*Example V*

Decylene glycol titanate, having three mols of a decylene glycol (2-propyl-1,3-heptanediol) per mol of titanium, was prepared by commingling the glycol and tetra-tertiary-butyl titanate in cyclohexane. This was washed with water, whereby the one alkoxy unit remaining unreacted on the titanium was hydrolyzed and the by-product tertiary-butyl alcohol was dissolved out. After removal of this by-product, the remaining material was found, by the conventional molecular weight and $TiO_2$ content determinations, to correspond to the structural formula "C" shown above, R being here a butyl group and R' a propyl radical.

*Example VI*

Five hundred and eighty-four parts by weight of the octylene glycol of Examples I and II and 340 parts of tetraisobutyl titanate were mixed in benzene solution and heated to 200° C. This caused evaporation of the benzene and of the butanol by-product of the alcoholysis. A syrupy liquid product resulted which was water-insensitive and had a structure similar to that hereinbefore given as "D", wherein R was a propyl and R' an ethyl unit.

*Example VII*

A 4:1 compound of octylene glycol titanate was prepared by heating 584 parts by weight of 2-butyl-1,3-butanediol with 284 parts of tetraisopropyl titanate at 200° C. The product was found to have a molecular weight of 648 and a $TiO_2$ content of 14.7%; theoretical values for this compound would be 628 molecular weight and 12.71% $TiO_2$.

The titanium esters which I find useful in my process are generally, as previously mentioned, organic esters of orthotitanic acid. Many of these are readily available and well-known in the art, and are easily prepared by reacting $TiCl_4$ with the desired anhydrous alcohol in the presence of a mild HCl acceptor like ammonia. A wide variety of these organic ortho esters may be employed to prepare the new products of my invention: e. g., alkyl titanates such as the methyl, ethyl, propyl, isopropyl, the different butyl, and similar esters; aryl esters, of which the best known is perhaps tetraphenyl titanate; alkaryl or aralkyl titanates; mixtures of these substances, condensed organic titanates and the like. I generally prefer to utilize orthotitanic acid esters of monofunctional alcohols, to avoid possible undesirable crosslinking and inter-reactions. Of course, each particular choice of titanium ester will be interdependent with the type of glycol utilized and the product desired.

As I have already explained, those glycols which I contemplate for use in my process are those having the general formula, $$R-CHOH-CH(R')-CH_2OH$$

or in other words branched-chain compounds of the 2,3-diorgano-1,3-diol type. R and R' may be the same or dissimilar organic radicals, provided they are substantially non-reactive under the particular operating conditions employed, viz., carbon chains, substituted carbon chains, alkyl or aryl or mixed, and the like. Normally, they will consist of carbon and hydrogen, sometimes including halogens and the like and preferably contain from 5 to 12 carbon atoms in their chain. Specific and preferred members of this class of glycols or dihydroxy alcohols include the hexylene glycols, octylene glycols, and decylene glycols, hereinbefore discussed, since the glycol titanates of this invention are especially easily prepared therefrom for commercial use and are generally of most value to industry. As also useful, however, are the various dodecylene glycols; 2,4-diphenyl-1,3-butanediol; 2,4-dimesityl-1,3-butanediol; and similar substances and mixtures thereof.

The reaction between the two ingredients may be carried out in the presence of an inert thinner or organic solvent such as benzene, cyclohexane, heptane and the like, to avoid high viscosity and thus promote ease in mixing and handling. Such solvent is generally not needed when the alcohol by-product continues present in the reaction mass, since the alcohol provides fluidity; but when, as during water-washing, the alcohol (if water-soluble) may be removed, its use may become more desirable. The need for a solvent will also be less when the ratio of glycol to titanate is greater, as in Example VII. Accordingly, the process provides flexibility by permitting use of a solvent, such use being governed by the conditions under which the reaction is to be carried out and the nature of the final product.

These new glycol titanates find use, depending on their nature, as adhesives, as gasoline additives, as constituents of synthetic fibers, as treating agents for textiles to impart water-repellency, as coatings and sealing agents for paper and similar materials, and in various like commercial fields. For instance, octylene glycol titanate particularly is of special value as an adhesive for polymers of ethylene and tetrafluorethylene, which have previously been extremely difficult to bond or laminate; it is also useful in preparing synthetic textile and other fibers; and it is a valuable new constituent of numerous coating compositions. It is obvious, then, that these products of my invention are new, much needed and important articles of commerce, and that the novel process whereby I prepare them is a surprisingly simple and ingenious one.

I claim as my invention:

1. A process for the preparation of organic solvent-soluble new organic compounds of titanium which comprises reacting an organic tetra ester of orthotitanic acid corresponding to the formula Ti(OR)$_4$, wherein R is selected from the group consisting of alkyl, aryl, aralkyl, and alkaryl with a glycol having the general formula $$R-CHOH-CH(R')-CH_2OH$$

wherein R and R' are carbon-containing organic radicals selected from the group consisting of alkyl, aryl, aralkyl, and alkaryl, and utilizing in the reaction molar proportions of glycol: orthotitanic acid ester of from ½:1 to 4:1.

2. A process for the preparation of organic solvent-soluble new organic compounds of titanium which comprises alcoholyzing an organic tetra ester of orthotitanic acid corresponding to the formula Ti(OR)$_4$, wherein R is selected from the group consisting of alkyl, aryl, aralkyl, and alkaryl with a glycol having the general formula $$R-CHOH-CH(R')-CH_2OH$$

wherein R and R' are carbon-containing organic radicals selected from the group consisting of alkyl, aryl, aralkyl, and alkaryl, employing in the reaction molar proportions of glycol:orthotitanic acid ester of from ½:1 to 4:1, and purifying the resulting alcoholysis product.

3. A process for the preparation of an organic solvent-soluble glycol titanate which comprises reacting one mol of an alcohol tetra ester of orthotitanic acid corresponding to the formula Ti(OR)$_4$, wherein R is selected from the group consisting of alkyl, aryl, aralkyl, and alkaryl with between one-half and four mols of a glycol having the general formula $$R-CHOH-CH(R')-CH_2OH$$

wherein R and R' are carbon-containing organic radicals selected from the group consisting of alkyl, aryl, aralkyl, and alkaryl, removing the by-product alcohol, and recovering the resulting glycol titanate.

4. A process for the preparation of a hexylene glycol titanate which comprises reacting an organic tetra ester of orthotitanic acid with a hexylene glycol of the 2,3-diorgano-1,3-diol type.

5. A process for the preparation of an organic solvent-soluble octylene glycol titanate which comprises reacting an organic tetra ester of orthotitanic acid corresponding to the formula Ti(OR)$_4$, wherein R is selected from the group consisting of alkyl, aryl, aralkyl, and alkaryl with between ½:4 mols of an octylene glycol of the 2,3-diorgano-1,3-diol type.

6. A process for the preparation of a decylene glycol titanate which comprises reacting an organic tetra ester of orthotitanic acid with a decylene glycol of the 2,3-diorgano-1,3-diol type.

7. As a new water-insensitive complex, an organic compound of titanium soluble in organic solvents having as its essential structural unit the radical $$-Ti-O-CH_2-CH(R')-CHR(O-)$$

wherein R and R' are carbon-containing organic radicals selected from the group consisting of alkyl, aryl, aralkyl, and alkaryl.

8. As a new water-insensitive complex, a chelated organic solvent-soluble titanium compound having as its essential structural unit the radical

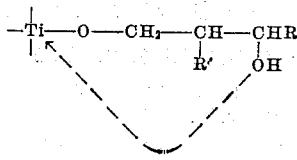

wherein R and R' are carbon-containing organic radicals selected from the group consisting of alkyl, aryl, aralkyl, and alkaryl.

9. As a new water-insensitive complex, a hexylene glycol titanate having as its essential structural unit the radical

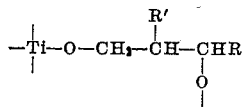

wherein R and R' are carbon chains together totalling three carbon atoms.

10. As a new water-insensitive complex, a chelated hexylene glycol titanate having as its essential structural unit the radical

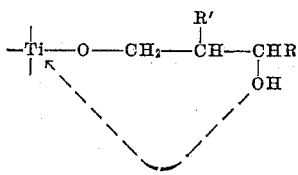

wherein R and R' are carbon chains together totalling three carbon atoms.

11. As a new water-insensitive complex, an octylene glycol titanate having as its essential structural unit the radical

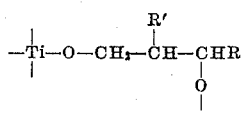

wherein R and R' are carbon chains together totalling five carbon atoms.

12. As a new water-insensitive complex, a chelated octylene glycol titanate having as its essential structural unit the radical

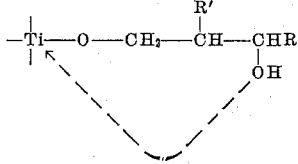

wherein R and R' are carbon chains together totalling five carbon atoms.

13. As a new water-insensitive complex, a decylene glycol titanate having as its essential structural unit the radical

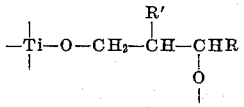

wherein R and R' are carbon chains together totalling seven carbon atoms.

14. As a new water-insensitive complex, a chelated decylene glycol titanate having as its essential structural unit the radical

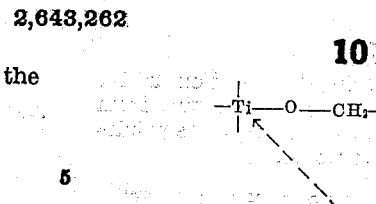

wherein R and R' are carbon chains together totalling seven carbon atoms.

15. Octylene glycol titanate corresponding to the formula

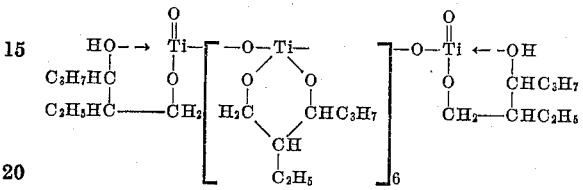

16. Decylene glycol titanate corresponding to the formula

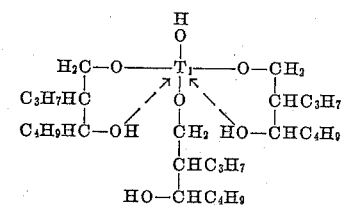

17. Hexylene glycol titanate corresponding to the formula

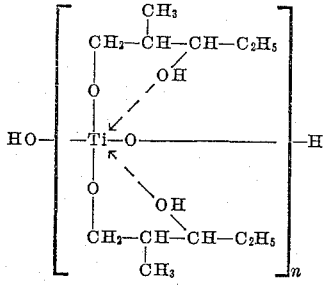

18. A process for preparing an organic solvent-soluble organic compound of titanium comprising reacting an orthotitanic acid ester corresponding to the formula $Ti(OR)_4$ wherein R is selected from the group consisting of alkyl, aryl, aralkyl, and alkaryl, with a glycol having the general formula

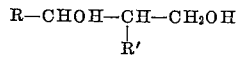

in which R and R' are organic radicals selected from the group consisting of alkyl, aryl, aralkyl, and alkaryl, employing in the reaction molar proportions of glycol:orthotitanic acid ester of from ½:1 to 4:1, and thereafter contacting the resulting reaction product with water.

19. A process for the preparation of an organic solvent-soluble titanium compound which comprises reacting an alkyl titanate with a glycol corresponding to the formula

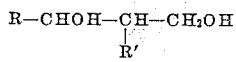

in which R and R' are organic radicals selected from the group consisting of alkyl, aryl, aralkyl, and alkaryl, employing in the reaction molar proportions of glycol:alkyl titanate ranging from ½:1 to 4:1, and thereafter contacting the resulting reaction product with water.

CHARLES O. BOSTWICK.

References Cited in the file of this patent

UNITED STATES PATENTS

| Number | Name | Date |
|---|---|---|
| 2,258,718 | Rothrock | Oct. 14, 1944 |

FOREIGN PATENTS

| Number | Country | Date |
|---|---|---|
| 568,135 | Great Britain | Mar. 20, 1945 |

OTHER REFERENCES

Bischoff et al.: J. Am. Chem. Soc., vol. 46 (1924), pages 256–258.

Hancock et al.: Jour. Oil and Colour Chem. Assn., vol. 24 (1941), pages 295–299.

Kraitzer et al.: Jour. Oil Colour Chem. Assoc., vol. 31 (1948), page 410.